(12) United States Patent
Osswald et al.

(10) Patent No.: US 12,517,074 B2
(45) Date of Patent: Jan. 6, 2026

(54) GAS MEASURING DEVICE AND GAS MEASURING DEVICE FOR MEASURING OF A TARGET GAS CONCENTRATION AND AN AMBIENT HUMIDITY

(71) Applicant: Dräger Safety AG & Co. KGaA, Lübeck (DE)

(72) Inventors: Jürgen Osswald, Lübeck (DE); Tom Pöthig, Lübeck (DE); Jan Philipp Ruge, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 346 days.

(21) Appl. No.: 18/366,821

(22) Filed: Aug. 8, 2023

(65) Prior Publication Data
US 2024/0053286 A1 Feb. 15, 2024

(30) Foreign Application Priority Data
Aug. 10, 2022 (DE) ...................... 10 2022 120 102.3

(51) Int. Cl.
*G01N 25/46* (2006.01)
(52) U.S. Cl.
CPC .................. *G01N 25/46* (2013.01)
(58) Field of Classification Search
CPC ...... G01N 25/46; G01N 25/32; G01N 33/225; G01N 27/16
See application file for complete search history.

(56) References Cited

U.S. PATENT DOCUMENTS

| | | | | |
|---|---|---|---|---|
| 4,627,269 A | * | 12/1986 | Forster | G01N 27/124 73/31.06 |
| 4,817,414 A | * | 4/1989 | Hagen | 73/23.31 |
| 5,142,898 A | * | 9/1992 | Kauschke | G01N 27/16 73/23.31 |

(Continued)

FOREIGN PATENT DOCUMENTS

| | | |
|---|---|---|
| DE | 4130099 A1 * | 3/1993 |
| DE | 38 08 305 C2 | 10/2001 |

(Continued)

*Primary Examiner* — Peter J Macchiarolo
*Assistant Examiner* — Mireille S Sadate-Moualeu
(74) *Attorney, Agent, or Firm* — McGlew and Tuttle, P.C.

(57) ABSTRACT

A gas measuring device (100) and a gas measuring process measure a concentration of a combustible target gas ($CH_4$). A detector (10), having a detector heating segment (20), oxidizes combustible target gas. A compensator (11) having a compensator heating segment (30) oxidizes less or no target gas. A temperature sensor (14) measures the ambient temperature. A first detection variable ($\Delta U\_B$) depends on the detector temperature, a second detection variable (U11) depends on the compensator temperature. An evaluation unit (9) applies a first and a second functional relationship in order to determine, depending on the two detection variables ($\Delta U\_B$, U11), both the target gas concentration and a further environmental condition, particularly the ambient humidity. The second functional relationship, a dependence between the further environmental condition on the one hand and the detection variables and the ambient temperature on the other hand, is valid if no target gas is present.

6 Claims, 4 Drawing Sheets

(56) References Cited

U.S. PATENT DOCUMENTS

| | | | |
|---|---|---|---|
| 10,031,095 B2 * | 7/2018 | Hill | G01N 27/16 |
| 2008/0282771 A1 | 11/2008 | Hamatani et al. | |
| 2009/0272175 A1 * | 11/2009 | Frerichs | G01N 27/4143 |
| | | | 73/25.01 |

FOREIGN PATENT DOCUMENTS

| | | | |
|---|---|---|---|
| DE | 102007021957 A1 | | 12/2007 |
| DE | 102006059566 A1 | * | 6/2008 |
| DE | 102017005713 A1 | | 12/2018 |
| DE | 102018122860 A1 | | 3/2020 |
| DE | 102021103563 A1 | | 8/2022 |
| DE | 102022106689 A1 | | 10/2022 |

* cited by examiner

GAS MEASURING DEVICE AND GAS MEASURING DEVICE FOR MEASURING OF A TARGET GAS CONCENTRATION AND AN AMBIENT HUMIDITY

CROSS REFERENCE TO RELATED APPLICATIONS

This application claims the benefit of priority under 35 U.S.C. § 119 of German Application 10 2022 120 102.3, filed Aug. 10, 2022, the entire contents of which are incorporated herein by reference.

TECHNICAL FIELD

The invention relates to a gas measuring device (gas detector) and a gas measuring process capable of measuring the concentration of a combustible target gas.

BACKGROUND

Gas measuring devices with a detector that is heated during operation have become known. The detector oxidizes a combustible target gas, and this step releases heat energy—of course, only if there is sufficient combustible target gas in the environment and thereby in the interior of the detector. The thermal energy released by oxidizing correlates with the target gas concentration and changes a property of the detector, such as electrical resistance. An indicator of this property is measured. Such a gas measuring device is also referred to as a heat tone sensor. The gas measuring device according to the invention also uses this principle.

However, the measurement results of such a gas measuring device are usually influenced not only by combustible target gas, but also by environmental conditions (ambient conditions, conditions in the vicinity). Therefore, a gas measuring device often comprises a compensator in addition to the detector, whereby the compensator does not oxidize any target gas or oxidizes to a smaller extent, but is ideally exposed to the environmental conditions in the same way as the detector and reacts on them in the same way. The gas measuring device according to the invention also comprises such a compensator.

DE 38 08 305 C2 describes a gas measuring device which is capable of measuring the concentration of a combustible target gas, for example methane. The gas measuring device comprises a measuring bridge 1, which includes a sensor for thermal conductivity 2, a measuring bridge 3 with a temperature sensor 4 and a measuring device 5 for humidity. In one implementation, a humidity sensor 6 of the measuring device 5 comprises a capacitor whose capacitance depends on the absorbed humidity. The target gas concentration is derived from a signal of the measuring bridge 1. The measured temperature and the measured humidity are used to compensate the influence of the temperature and that of the humidity on the signal of the measuring bridge 1.

The gas measuring device of DE 41 30 099 A1 draws a gas sample into a combustion chamber. A measuring bridge 1 comprises a catalytically active measuring sensor 2 as a measuring element and a catalytically inactive sensor 3 as a compensating element, plus two fixed resistors 4 and 5. A temperature sensor 8 in a measuring head 7 inside the gas meter measures the temperature so that the influence of changing ambient temperatures and different temperatures in the two combustion chamber chambers 7a can be compensated for.

DE 10 2007 021 957 A1 shows a gas sensor with a detecting element 7 in the form of a detecting bead and a compensator element 8 in the form of a compensator bead. The detecting bead 7 is coated with a catalytic material, the compensator bead 8 is not. The two elements 7, 8 are arranged in an electrical bridge circuit in the form of a Wheatstone measuring bridge, which additionally comprises equilibrium resistors R1, 20, 22 and a balancing resistor 24. The balancing resistor 24 keeps the bridge circuit in equilibrium as long as no combustible target gas is present. The process of the detecting bead 7 oxidizing combustible target gas changes the resistance of leads in the bridge circuit, and a voltmeter 26 measures a signal. The voltage across the compensator bead 8 may change independently of the voltage across the detecting bead 7. A voltmeter 30 measures the voltage across compensator bead 8, and this voltage is an indicator of ambient temperature.

SUMMARY

It is an object of the invention to provide a gas measuring device which is capable of measuring the concentration of a combustible target gas and which has a simpler configuration than known gas measuring devices while maintaining approximately the same reliability. Furthermore, it is an object of the invention to provide a gas measuring process using such a gas measuring device.

The task is accomplished by a gas measuring device having gas measuring device features according to the invention and by a gas measuring process having gas measuring process features according to the invention. Advantageous embodiments of the gas measuring device according to the invention are, as far as useful, also advantageous embodiments of the gas measuring process according to the invention and vice versa.

The gas measuring device according to the invention and the gas measuring process according to the invention are capable of measuring the concentration of a combustible target gas. This combustible target gas occurs in the environment of the gas measuring device, in particular in a spatial area to be monitored. This environment is, for example, in a chemical manufacturing plant or is an enclosed space of a building or the interior of a vehicle.

It is possible that several combustible target gases are present in the environment at the same time. In one embodiment, "the combustible target gas" is understood to mean one of these target gases. In another embodiment, the measured target gas concentration is understood to be the sum of the concentrations of all combustible target gases present in the environment.

The gas measuring device comprises a detector with a detector heating segment and a compensator with a compensator heating segment. At least temporarily, a fluid connection is established between the detector and the compensator on the one hand and the environment of the gas measuring device on the other hand. A gas sample from the environment can reach both the detector and the compensator simultaneously through this fluid connection. Preferably, this fluid connection is interrupted when the gas measuring device is not in use.

The gas measuring device can apply an electrical voltage to both the detector and the compensator. The two applied electrical voltages can always coincide or at least temporarily differ from each other. In a preferred implementation, the electrical voltages are applied in a pulsed manner.

When an electrical voltage is applied to the detector, electrical current flows through the detector heating segment, thereby causing the detector heating segment to be heated. When an electrical voltage is applied to the compensator, electrical current flows through the compensator heating segment, thereby causing the compensator heating segment to be heated.

The detector is capable of causing the following: heating the detector heating segment causes combustible target gas to be oxidized, whereby this combustible target gas is located inside the gas measuring device. Of course, this effect can only occur if combustible target gas with a sufficiently high concentration is present in the environment and therefore also inside the gas measuring device.

In a first alternative, due to its configuration, the compensator is capable of oxidizing the combustible target gas to a lesser extent than the detector, or even not at all, despite heating of the compensator segment. In a second alternative, the gas measuring device is configured as follows: A smaller amount per time unit of the combustible target gas flows from an environment of the gas measuring device to the compensator than to the detector. These two alternatives can be realized simultaneously (in combination).

The gas measuring device further comprises a sensor arrangement. The sensor arrangement is capable of measuring, preferably repeatedly measuring, a first detection variable and a second detection variable. The second detection variable is different from the first detection variable, and the two detection variables may vary independently over time or depend on each other. Preferably no detection variable depends on the other detection variable.

In a first alternative, the first detection variable depends on the detector temperature, but preferably not on the compensator temperature. The second detection variable depends on the compensator temperature, but preferably not on the detector temperature. By "detector temperature" the temperature of the detector heating segment is meant, and by "compensator temperature" the temperature of the compensator heating segment is meant. In a second alternative, the first detection variable depends on both the detector temperature and the compensator temperature, in particular on the difference between the detector temperature and the compensator temperature. The second detection variable depends either on the detector temperature but not on the compensator temperature, or on the compensator temperature but not on the detector temperature.

Furthermore, the gas measuring device comprises a temperature sensor. The temperature sensor is capable of measuring, preferably repeatedly measuring or continuously measuring, an indicator of an ambient temperature, i.e. a temperature in the environment of the gas measuring device. The measurement position at which the temperature sensor measures the indicator of ambient temperature may be inside or outside a housing of the gas measurement device. Ideally, neither the detector temperature nor the compensator temperature will influence the ambient temperature measurement, which is achieved, for example, by suitable thermal insulation between the detector and the compensator on the one hand and the temperature sensor on the other. It is also possible that the gas measuring device receives a signal with information about the ambient temperature from a spatially remote temperature sensor. The temperature sensor is not necessarily a part of the gas measuring device. This signal with the ambient temperature can be transmitted to several gas measuring devices according to the invention.

A model that can be evaluated by computer is stored in a data memory of the gas measuring device. This model is given to the gas measuring process according to the invention. The model was generated prior to an application of the gas measuring device. "Computer evaluable" means that a program can automatically evaluate and/or apply this model during execution of the program.

This stored model comprises a first functional relationship and a second functional relationship. The first functional relationship describes a dependence between the target gas concentration on the one hand and at least the first detection variable on the other hand. Optionally, the ambient temperature and/or the second detection variable additionally occur in the first functional relationship, and the target gas concentration according to the first functional relationship additionally depends on the ambient temperature and/or on the second detection variable.

The second functional relationship describes a dependence between a first further environmental condition on the one hand and the ambient temperature as well as the first detection variable and/or the second detection variable on the other hand. The first further environmental condition is different from the ambient temperature. It is possible that the target gas concentration according to the first functional relationship additionally depends on the first further environmental condition.

In particular, the first further environmental condition is the ambient humidity or the ambient pressure or the concentration of carbon dioxide or of another gas that is not harmful to humans in the ambient air. It is also possible that the first further environmental condition describes the summed influence of all those further environmental conditions that are not measured by a sensor of the gas measuring device, i.e. in particular the summed influence of ambient humidity and ambient pressure. The approach of describing by the first further environmental condition all further environmental conditions not directly measured and determining the first further environmental condition is especially justified if it can be assumed with sufficient accuracy that both the detector temperature and the compensator temperature depend linearly on each further environmental condition not directly measured. In practice, this assumption is often correct.

The ambient temperature and the or any other environmental condition generally occur independently of the presence and concentration of a combustible target gas and are generally not harmful to a human, at least not harmful at a sufficiently low value or concentration.

The second functional relationship is at least valid, i.e. describes the physical reality sufficiently accurately, if the concentration of the target gas in the environment and therefore inside the gas measuring device is below a specified concentration threshold. At a higher target gas concentration, the second functional relationship is not necessarily valid, but the first functional relationship is valid.

A signal-processing evaluation unit of the gas measuring device has at least temporary read access to the data memory with the model. The evaluation unit is able to determine at least approximately the concentration of the target gas—more precisely: to derive a value for the target gas concentration. To determine the target gas concentration, the evaluation unit uses the measured first detection variable and optionally the measured ambient temperature and/or the measured second detection variable. For determining the target gas concentration, the evaluation unit applies the stored first functional relationship. As a rule, the evaluation unit is only able to determine the target gas concentration approximately.

The evaluation unit is able to automatically determine whether the second functional relationship is valid or not at the determined target gas concentration. Preferably, the evaluation unit compares the determined concentration of the target gas in the environment of the gas measuring device with the specified concentration threshold for this decision.

Furthermore, the evaluation unit is configured to carry out the following step: If the evaluation unit has decided that the second functional relationship is currently valid, the evaluation unit determines the first further environmental condition—more precisely: derives a value for the first further environmental condition. To determine the first further environmental condition, the evaluation unit uses the measured ambient temperature as well as the first measured detection variable and/or the second measured detection variable, optionally both detection variables. More specifically, to determine the first further environmental condition, the evaluation unit uses a value for the first detection variable and/or a value for the second detection variable, the or each value used having been measured when the target gas concentration was below the concentration threshold. For determining the first further environmental condition, the evaluation unit applies the second functional relationship.

According to the invention, the detector oxidizes a combustible target gas inside the gas measuring device—of course only if a sufficient amount of combustible target gas is present in the interior. During oxidation, heat energy is released, and the released heat energy acts on the detector heating segment. As a result, the released heat energy increases the temperature of the detector heating segment compared to a condition without combustible target gas. This temperature increase is an indicator of the concentration of combustible target gas inside the gas measuring device, and thus in an environment surrounding the gas measuring device. At least one of the two detection variables depends on the detector temperature, i.e., the temperature of the detector heating segment. As is well known, the temperature changes the electrical resistance of many electrically conductive materials, and at least one detection variable depends on the temperature and therefore on the electrical resistance of the detector heating segment.

However, the detector temperature is not only influenced by the thermal energy released during oxidation of combustible target gas, but usually also by the ambient temperature and at least one further environmental condition. The ambient temperature is measured by the temperature sensor, and in one embodiment, the evaluation unit uses the measured ambient temperature to determine the target gas concentration. In many cases, the ambient temperature influences the detector temperature more than any other environmental condition. Therefore, the feature that the gas measuring device includes a temperature sensor increases the reliability of the gas measuring device compared to a gas measuring device without an own temperature sensor.

The gas measuring device according to the invention is able to compensate the influence of the or at least one further environmental condition on the determination of the target gas concentration to a certain extent by its configuration and/or by calculation. The gas measuring device achieves this effect by the fact that the gas measuring device comprises, in addition to the detector, a compensator with a compensator heating segment. The first detection variable and/or the second detection variable depend on the compensator temperature. In one implementation, the first functional relationship is configured such that the or each further environmental condition influences the target gas concentration determined by means of the first functional relationship only in a non-relevant way, ideally not at all. This is often possible because the or each further environmental condition ideally influences the detector and the compensator in the same way.

According to the invention, two different detection variables and the ambient temperature are measured by the gas measuring device. The evaluation unit uses at least measured values of these three variables as well as the two stored functional relationships to determine the target gas concentration on the one hand and the first further environmental condition on the other hand. Thus, two different functional relationships are applied to determine two unknown variables, namely the target gas concentration and the first further environmental condition.

The invention discloses a way to determine the first further environmental condition without requiring a sensor for the first further environmental condition. An environmental condition sensor is often inevitably relatively large and/or heavy and typically consumes electrical power. In addition, such a sensor usually must be adjusted at least prior to use and be monitored in use. Therefore, it is advantageous not to necessarily rely on such an environmental condition sensor being part of the gas measuring device. The invention provides a gas measuring device which is capable of detecting the first further environmental condition and is of simpler construction than a gas measuring device which additionally comprises a sensor for the first further environmental condition.

It is sufficient to establish the second functional relationship such that it is valid at least when the target gas concentration is below the concentration threshold. In many cases this feature makes it easier to set up a second functional relationship that matches the physical reality sufficiently accurately, compared to a second functional relationship that is supposed to be valid at any target gas concentration. In general, this feature leads to only a relatively small limitation. This is because, in most cases in practice, the desired normal situation occurs, namely that combustible target gas escapes relatively rarely and therefore the target gas concentration is usually below the concentration threshold. Therefore, the gas measuring device according to the invention is usually able to provide current values for the first further environmental condition over relatively long periods of time, namely at a target gas concentration below the concentration threshold, which is the normal situation. If a target gas concentration above the concentration threshold occurs, a previously determined value for the first further environmental condition can often be used for the first further environmental condition, or a previously determined time course of the first further environmental condition can be extrapolated into the future. As a rule, the first further environmental condition changes only relatively slowly.

In general, the influence that the combustible target gas takes on the detector temperature due to oxidizing exceeds the influence of the or each further environmental condition on the detector temperature—provided that the target gas concentration is greater than or equal to the concentration threshold. Therefore, the first functional relationship describes the physical reality sufficiently accurately even if the first further environmental condition does not occur in the first functional relationship or if a predefined default value or a derived value of the past in place of a measured current value is used for the first further environmental condition in the first functional relationship. In particular, the evaluation unit is able to make the decision whether the target gas concentration is above or below the concentration threshold without knowledge of the first further environmental condition. On the one hand, the result of this decision is used according to the invention for checking whether the second functional relationship is currently valid or not. On the other hand, the result of this decision can be used to generate a warning in case of a target gas concentration above the concentration threshold, whereby this warning is issued in a form that can be perceived by a human, in particular visibly, acoustically and/or haptically (by vibrations).

According to the invention, the first detection variable is used for determining the target gas concentration—more precisely, a value of the first detection variable is used. Furthermore, according to the invention, a decision is made whether the second functional relationship is valid or not, for which decision the determined target gas concentration is used. In one embodiment, the target gas determination and/or the decision are made depending on the measured first detection variable—more precisely depending on at least one value of the first detection variable—without using the second detection variable. In many cases this embodiment saves computing time.

In one embodiment, the target gas concentration and the first further environmental condition are determined with the same sampling frequency. In a preferred alternative embodiment, however, the target gas concentration is determined with a higher sampling frequency than the first further environmental condition, preferably with a sampling frequency at least twice as high. This embodiment takes into account the fact that the target gas concentration may change rapidly, particularly in the case that a leak has occurred, while the or each further environmental condition generally changes relatively slowly. On the one hand, the configuration with the different sampling frequencies makes it possible to quickly detect an increasing target gas concentration and, on the other hand, saves computing time and/or computing capacity compared to a configuration in which the first further environmental condition is also determined with a high sampling frequency.

In one embodiment of the invention, both the detector and the compensator are components of a Wheatstone measurement bridge. As a first detection variable, the sensor arrangement measures a bridge voltage between the detector and the compensator. Thus, the first detection variable depends on both the detector temperature and the compensator temperature. This implementation uses a proven technique to measure the concentration or amount of a combustible target gas.

In one embodiment, a zero value (reference value) is determined in advance for the first detection variable and/or for the second detection variable. The detection variable assumes this zero value if the target gas concentration is below the concentration threshold and the ambient temperature and any other environmental condition assume a respective standard value. During an operation of the gas measuring device, the difference between the measured value of the detection variable and the zero value determined in advance is used as the value of the detection variable.

In one embodiment, the stored first functional relationship describes the dependence between the target gas concentration on the one hand and the first detection variable, the first further environmental condition and optionally the ambient temperature and/or the second detection variable on the other hand. According to this embodiment, the first further environmental condition thus occurs not only in the second functional relationship, but also in the first functional relationship. According to this embodiment, the evaluation unit uses a value for the first further environmental condition to determine the target gas concentration using the first functional relationship. As a value for the first further environmental condition, the evaluation unit uses either a value that it has derived using the second functional relationship or a predefined default value or at least one value determined in the past, optionally a continuation of a series of values. Of course, a determined value for the first further environmental condition can only be used if the second functional relationship was valid at least temporarily beforehand. Preferably, the evaluation unit then uses the default value if it has not yet determined a value for the first further environmental condition or if the last determined value is no longer considered valid, for example because too much time has elapsed since it was determined or because it is considered implausible.

In many cases the embodiment that the target gas concentration is additionally determined using a determined value for the first further environmental condition increases the reliability of the gas measuring device. In particular, the risk that a specific first further environmental condition falsifies a measurement result is reduced.

In one embodiment, in the second functional relationship the second detection variable occurs but not the first detection variable. According to this embodiment, the second detection variable depends on the compensator temperature, but not on the detector temperature. This embodiment is particularly advantageous for the following reasons: the detector temperature usually depends more on the target gas concentration than on the first further environmental condition. The compensator temperature, on the other hand, depends less than the detector temperature on the target gas concentration.

According to the invention, the evaluation unit determines a value for the first further environmental condition. In one embodiment, a range of values is specified for the first further environmental condition. For example, the gas measuring device is only able to determine the target gas concentration sufficiently reliably if the first further environmental condition lies within this value range. Or, for physical reasons, the first further environmental condition can only assume values in the value range, so that a determined value outside the value range is physically impossible and therefore an indication of a measurement error.

If the evaluation unit has determined a value for the first further environmental condition that lies outside the specified value range, the gas measuring device according to this embodiment is able to cause the following: The gas measuring device generates a message, this message preferably comprising information about the measured first further environmental condition. The gas measuring device preferably triggers the step of outputting this message in a form that can be perceived by a human. In one implementation, this output is performed by an output unit of the gas measuring device itself. In another implementation, the message is transmitted to a spatially remote receiver, and an output unit of the spatially remote receiver outputs the message. A value outside the value range can be an indication that the gas measuring device is used outside a permissible range of use. Or the gas measuring device has a fault or malfunction, and an indication of this fault is automatically detected.

The embodiment with the range of values for the first further environmental condition reduces the risk that the gas measuring device provides a false result for the target gas concentration because the first further environmental condition is outside the range of values, and the measurement result of the gas measuring device is not recognized as a false measurement result. Also, in this embodiment, it is not necessary to use a sensor that directly measures the first further environmental condition.

The invention enables, but saves the need for, the gas measuring device to receive a signal from an environmental condition sensor, wherein the environmental condition sensor measures an indicator of the first further environmental condition and the signal comprises information about the measured first further environmental condition. In one embodiment, the gas measurement device is adapted to receive such a signal, and the evaluation unit is adapted to derive a value for the first further environmental condition by evaluating the received signal. This environmental condition sensor may be a component of the gas measuring device or may be spatially remote from the gas measuring device. In the second implementation, the signal is transmitted from the environmental condition sensor to the gas measuring device.

According to this embodiment, therefore, two values are available for the first further environmental condition, these two values preferably refer to the same sampling time. The first value has been determined according to the invention by the evaluation unit using the second functional relationship. The second value has been determined by the evaluation unit by evaluating the received signal. In a first application of this embodiment, the evaluation unit may selectively use the first value or the second value for the first further environmental condition. For example, it uses the second value if such a second value is present and optionally sufficiently current (up to date) and/or has been measured at a measurement position that is sufficiently close to the gas measurement device. Otherwise, it uses the determined first value. In a second application of this embodiment, the evaluation unit compares the first value with the second value. This enables the evaluation unit to perform a plausibility check and, for example, to generate a message in the event of a large deviation between the two values or to use the one of the two values that is deemed to be more reliable. These two applications can be combined with each other.

According to the invention, the gas measurement device comprises a temperature sensor. In one embodiment, the gas measuring device comprises a second environmental condition sensor. This sensor is configured to measure an indicator of a second further environmental condition. This second further environmental condition is different from the ambient temperature and from the first further environmental condition. The second further environmental condition occurs in the first functional relationship and/or in the second functional relationship. For example, ambient humidity is the first further environmental condition, and ambient pressure is the second further environmental condition. Often, the ambient pressure is much easier to measure than the ambient humidity. In some cases, embodiments including the second environmental condition sensor increase the reliability with which the gas measurement device determines the target gas concentration and/or the first further environmental condition.

According to the invention, the evaluation unit applies a stored computer-evaluable model. In one embodiment, this model is an analytical model which has been set up in advance and preferably comprises at least one model parameter, particularly preferably several model parameters. Before the gas measuring device is used, a respective value is assigned to the or each model parameter. In one embodiment every functional relationship of the model depends linearly on the detection variables and optionally on environmental conditions wherein in the model parameters are proportional factors.

The model can also be a trained neural network or another model that has been generated by a machine learning process. It is also possible that both functional relationships are realized by a respective neural network. It is also possible that one functional relationship is an analytical model, and the other functional relationship is realized by a neural network. To set up the model by a machine learning process, a sample is used, wherein each element of the sample comprises a respective value for the first detection variable, the second detection variable, the ambient temperature and the first further environmental condition, optionally additionally a value for a second further environmental condition. Thus, to generate the sample, a sensor for the first further environmental condition is used. However, this sensor is not necessarily required for the use of the gas measuring device.

According to the invention, the evaluation unit applies a model with a first and a second functional relationship. In one embodiment, a calibration device is capable of generating this model and causing this model to be stored in the data memory of the gas measurement device. The calibration device comprises an environmental condition sensor. This environmental condition sensor is capable of measuring an indicator of the first further environmental condition. This environmental condition sensor is not necessarily used for the operation of the gas measuring device, but according to this embodiment for the generation of the model.

The calibration device is capable of generating a sample with several sample elements. Each sample element comprises at least four values each, namely a value for the first detection variable, a value for the second detection variable, a value for the ambient temperature and a value for the first further environmental condition, optionally a value for the second further environmental condition. The two values for the two detection variables and the value for the ambient temperature were measured by the gas measurement device, and the value for the first further environmental condition was measured by the environmental condition sensor. Preferably, these at least four values refer to the same sampling time.

According to this embodiment, the calibration device is able to generate the two functional relationships. For this purpose, the calibration device applies a machine learning procedure to the sample. In one embodiment the calibration device derives a respective value for every model parameter. In a further embodiment the calibration device generates a neural network depending on the sample.

Because the sensor arrangement and the temperature sensor of the gas measurement device are used to generate the sample, the risk is reduced that the two functional relationships used are not sufficiently accurate for the gas measurement device. This risk would be greater if a different sensor arrangement and/or temperature sensor were used.

As mentioned above, in one embodiment, the two functional relationships are two analytical model equations, each with at least one model parameter. The calibration device applies the learning procedure to the sample to calculate a value for each model parameter—unless a predefined default value is used for a model parameter. In another embodiment, the calibration device trains a neural network using the sample. As explained above, these two embodiments can also be combined, for example, by the calibration device calculating a value for the or each model parameter of one functional relationship and training a neural network that implements the other functional relationship.

The gas measuring device according to the invention may be configured as a portable device. A user carries this portable device, and the portable device alerts the user when a combustible target gas with a concentration above a threshold is present in the user's environment. In this application, the gas measuring device preferably includes its own power supply unit. The gas measuring device may also be configured as a stationary device and is preferably connected or connectable to a stationary voltage supply network. It is also possible that several gas measuring devices according to the invention, each with its own voltage supply unit, are distributed over a larger area in order to monitor this larger area for at least one target gas.

Preferably, the gas measuring device according to the invention is able to generate an alarm if the determined target gas concentration is above a concentration threshold, for example above that concentration threshold which also limits the validity of the second functional relationship. In one embodiment, the gas measuring device comprises its own output unit, which is capable of outputting the generated alarm in at least one form that can be perceived by a human, in particular visually and/or acoustically and/or haptically (by vibrations). In another embodiment, the gas measuring device causes, at a target gas concentration above the concentration threshold, a message with the alarm to be transmitted to a spatially distant receiver and the spatially distant receiver to output the alarm in a form perceptible by a human.

The components of the gas measuring device according to the invention can be arranged in a housing. Alternatively, the evaluation unit can also be arranged spatially remote from the other components of the gas measuring device according to the invention and at least temporarily be in a data connection with the sensor arrangement.

In the following, the invention is described by means of embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
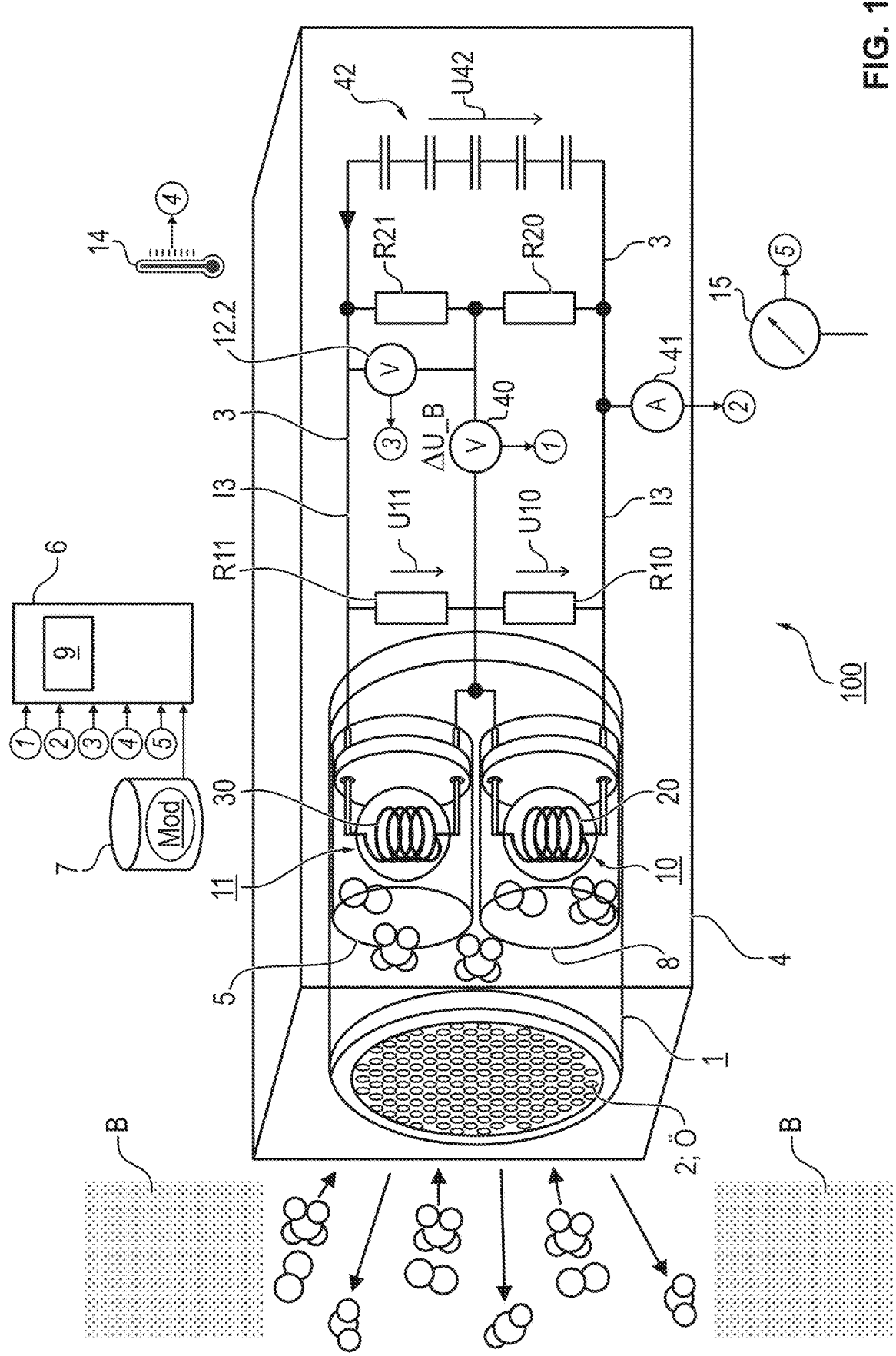
FIG. 1 is a schematic view showing a first embodiment of the gas measuring device, wherein the detector and the compensator are arranged in a Wheatstone measuring bridge.

Referring to the drawings, the gas measuring device according to the invention and the gas measuring process according to the invention are able to monitor a spatial area for the presence of at least one combustible target gas and/or to determine at least approximately the concentration of a combustible target gas in this area. In one application, the gas measuring device is capable of determining an indicator of a sum of the target gas concentrations when multiple combustible target gases are present. The gas measuring device uses a process known in the prior art to analyze a gas mixture in the area.

In the embodiment, the gas measuring device is configured as a portable device. A user may carry this device while staying in an area to be monitored. The gas measuring device may also be stationary. It is possible that only the sensor technology described below is arranged in the area to be monitored and an evaluation unit and an optional output unit are arranged at spatially remote positions. This reduces the risk of the evaluation unit or the output unit being damaged by harmful gases in the area. At least temporarily, a data link is established between the sensor system on the one hand and the evaluation unit and the optional output unit on the other.

A detector is located inside a housing of the gas measuring device. Through an opening of the housing, a gas mixture diffuses from the area to be monitored into the interior of the housing or is conveyed into the interior, e.g. sucked by a pump.

The detector includes an electrically conductive wire having a heating segment. The detector heating segment is, for example, a coil forming a segment of the wire. The electrically conductive material is, for example, platinum or rhodium or tungsten or an alloy using at least one of these metals. An electric voltage U is applied to this wire so that electric current flows through the wire. The flowing current heats the detector heating segment, and the heated detector heating segment emits heat energy. The emitted heat energy causes at least one combustible target gas to be oxidized inside the enclosure—of course, only if the area and thus the interior contain combustible target gas.

In one application, methane ($CH_4$) is a combustible target gas to be detected. When heat energy is added, methane reacts with oxygen to produce water and carbon dioxide. Thus, $CH_4$ and $2*O_2$ become $2*H_2O$ and $CO_2$.

When the target gas is oxidized, thermal energy is released inside the housing. This heat energy acts on the detector and increases the temperature of the wire through which current flows and which is heated. This temperature increase correlates with the thermal energy released and thus with the concentration of the target gas inside the housing. A gas measuring device with such a detector is sometimes referred to as a "heat tone sensor".

The temperature change alters a property of the detector which correlates with the detector temperature, for example the electrical resistance R of the wire of the detector through which the current flows. As is well known, for many electrically conductive materials, the higher the temperature of the conductive material is, the higher the electrical resistance is. The gas measuring device measures at least one measurable quantity which is influenced by the property and thus by the detector temperature, and which is referred to hereinafter as the "detection variable". The detection variable is, for example, directly the temperature or a quantity which correlates with the electrical resistance R of the wire, for example the electrical voltage U applied to the detector or the current (amperage) I or the electrical power P absorbed by the detector wire. If another measurable quantity which also depends on the electrical resistance R is kept constant, the measured detection variable correlates with the sought concentration of the target gas. For example, if the current I of the current flowing through the detector is kept constant, the electrical voltage U applied to the detector correlates with the electrical resistance R of the wire, the resistance R correlates with the temperature of the wire, the temperature of the wire correlates with the target gas concentration, and thus the measured electrical voltage U correlates with the sought target gas concentration—in the presence of several target gases with the combination (sum) of target gas concentrations.

FIG. 1 shows an example of a first embodiment of the gas measuring device 100 according to the invention. In the embodiment, a detector 10 is arranged in a detector chamber 8 and a compensator 11 is arranged in a compensator chamber 5. The detector chamber 8 with the detector 10 and the compensator chamber 5 with the compensator 11 are located in a stable housing 1. Thanks to an opening Ö, the stable housing 1 is in fluid connection with the area to be monitored, so that gas can pass from the area to be monitored into the interior of the housing 1 and there also into the interior of the detector chamber 8. A flame barrier (flame guard) 2, for example a metallic grid, in the opening Ö reduces the risk of flames striking outward from the interior of the stable housing 1. The stable housing 1 is surrounded by an outer housing 4 shown schematically, which is preferably easy to grip and hold.

The electrical voltage U applied to the detector 10 causes an electric current to flow. The flowing current heats the detector heating segment 20 to a working temperature, which is often between 400° C. and 500° C. However, this working temperature alone is usually not sufficient to oxidize a combustible target gas in the inner housing 1. A higher working temperature is often undesirable because it could cause combustible target gas to burn or even explode, which is often undesirable, and also consumes more electrical energy.

In order to be able to oxidize a combustible target gas despite a working temperature below 500° C., the detector 10 comprises a catalytic material which oxidizes the target gas in conjunction with the heated detector heating segment 20. Therefore, a gas measuring device comprising such a detector 10 is also referred to as a "catalytic sensor".

In a commonly used implementation, the detector heating segment 20 is surrounded by electrical insulation, for example a ceramic coating. This electrical insulation electrically isolates the detector heating segment 20 and, in particular, prevents an unwanted short circuit. The electrical insulation is thermally conductive to allow the detector heating segment 20 to dissipate heat energy into the environment of the detector 10 and, conversely, to allow heat energy from the environment to further heat the detector heating segment 20. A coating of a catalytic material is applied to this electrical insulation. Alternatively, a catalytic material is embedded in the electrical insulation. This catalytic coating comes into contact with the gas mixture in the inner housing 1 and thus also with a combustible target gas. A detector 10 constructed in this way is often referred to as a "pellistor".

Figure 2:
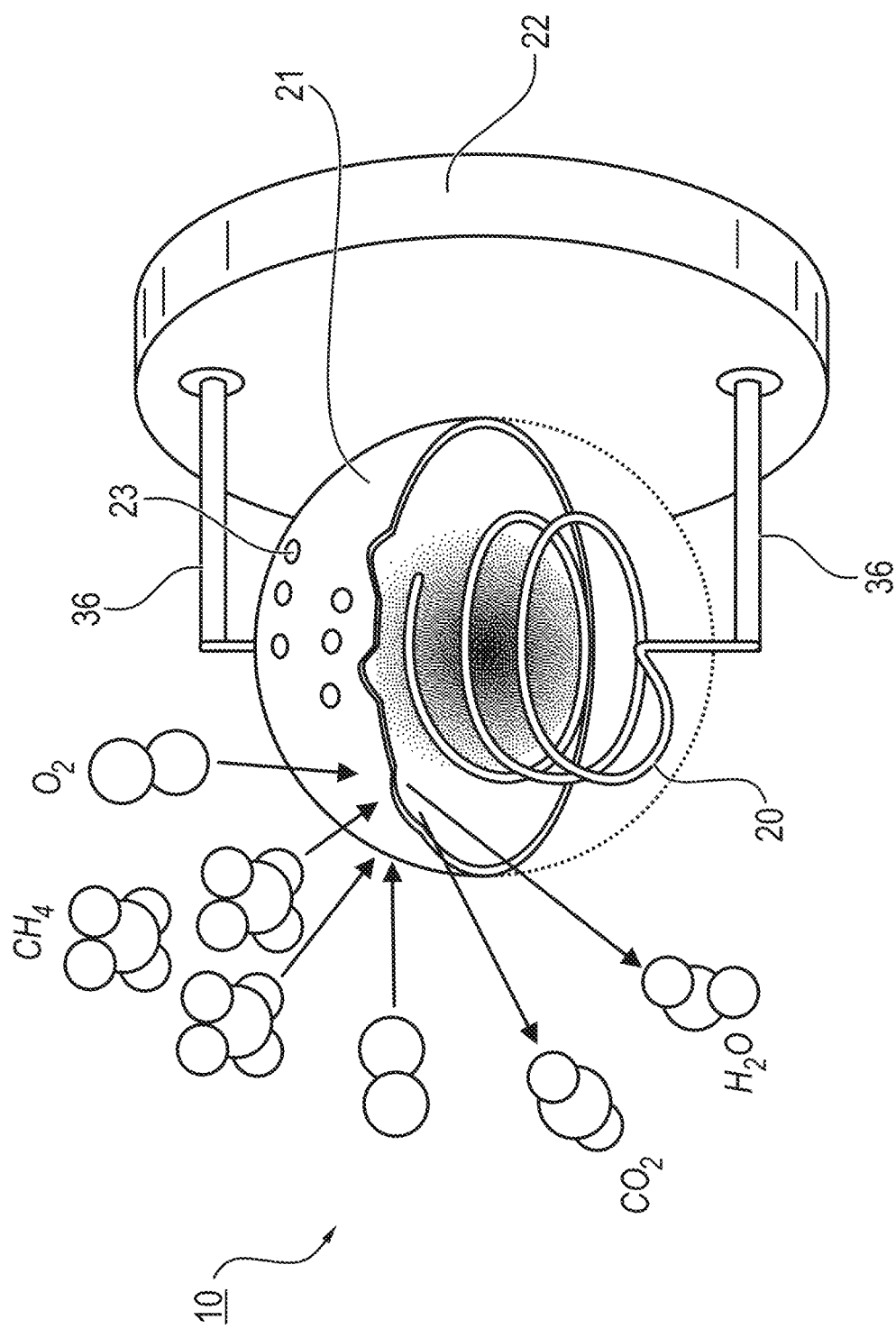
FIG. 2 is a schematic perspective and partially sectional view showing an example of a detector in the form of a pellistor.

FIG. 2 shows an example of a detector 10 in the form of a pellistor and a schematic diagram of the conversion of methane ($CH_4$) into $CO_2$ and $H_2O$. The detector 10 comprises
- a spirally wound and electrically conductive wire 20 acting as a detector heating segment and made, for example, of platinum,
- a ceramic sheathing (jacketing) 21 surrounding the detector heating segment 20 and, in the example shown, having the shape of a solid sphere,
- a catalytic coating on the outer surface of the ceramic sheathing 21, which is indicated by circles 23 in FIG. 2,
- a mounting plate 22 and
- electrical connections and mechanical supports 36 for the wire 20.

For example, platinum or palladium is used as the catalytic material. Alternatively, or in addition to the catalytic coating, catalytic material 23 can also be embedded in the ceramic coating 21.

In a preferred embodiment, the solid sphere of the detector 10 has a porous surface with a catalytic coating 23. In one embodiment, this porous surface is manufactured as follows: the detector 10 with the porous surface but without the catalytic coating is provided. The catalytic coating 23 is applied to the porous surface, and a portion of the catalytic material penetrates into the interior of the detector 10. Thanks to this porous surface, the detector 10 has a larger surface area compared to a smooth surface. Thanks to this larger surface area, the detector 10 is better able to oxidize combustible target gas, especially because a larger amount of target gas comes into contact with the catalytic material. A gas can reach deeper layers of the detector 10 thanks to the porous surface.

However, the temperature of the detector 10 and thus the or a detection variable is affected not only by the thermal energy released, but also by environmental conditions in the area to be monitored, in particular by the ambient temperature, furthermore by the humidity, the ambient pressure and by non-flammable gases, e.g. $CO_2$, in the air. These environmental conditions can also change the conditions inside the inner housing 1. Indeed, these environmental conditions may also affect the detector temperature and thus a detection parameter, for example because the thermal conductivity in the environment of the detector 10 is changed. It is desired that the gas measuring device 100 is capable of reliably detecting a combustible target gas despite varying environmental conditions on the one hand, and on the other hand, generates few false alarms, i.e., rarely decides that a target gas is present when in fact no target gas above a detection threshold has occurred, which is an erroneous result.

Therefore, the gas measuring device 100 compensates constructively and/or computationally to a certain extent for the influence of environmental conditions on the detection variable, which variable depends on the temperature of the detector heating segment 20. For this purpose, the gas measuring device 100 comprises, in addition to the detector 10, a compensator 11, cf. FIG. 1. The compensator 11 also comprises a wire with a compensator heating segment. An electric voltage U is also applied to the compensator 11, so that electric current flows and the heating segment of the compensator wire is also heated. The compensator 11 is also exposed to the varying environmental conditions.

In one embodiment, the compensator 11 also includes a spirally wound and electrically conductive wire that functions as a compensator heating segment and is designated by reference numeral 30. The compensator 11 also includes a ceramic sheathing, a mounting plate, electrical connections, and mechanical mounts. However, unlike the detector 10, the ceramic sheathing of the compensator 11 does not include a catalytic coating or does not comprise catalytic material.

In another implementation, the compensator 11 is constructed in the same way as the detector 10, i.e. also comprises a ceramic coating. However, the gas measuring device 100 is configured in such a way that in a time unit less gas from the area B to be monitored can reach the compensator 11 than the detector 10.

FIG. 1 shows the compensator 11 in the compensator chamber 5. It can be seen that the detector 10 comprises the detector heating segment 20 and the compensator 11 comprises a compensator heating segment 30. In the example shown, the compensator 11 is also configured as a spherical pellistor, but unlike the detector 10, it does not comprise a catalytically active coating 23.

FIG. 1 shows the following other components of the gas measurement device 100:
- an own voltage source 42, such as a set of rechargeable batteries,
- an electrical line 3 connecting the voltage source 42 to the detector 10 and the compensator 11,
- a voltage sensor 40,
- a voltage sensor 12.2,
- a current sensor 41,
- two electrical resistors R20 and R21, and
- a signal-processing control unit 6.

Optionally, a thermal barrier, not shown, inside the gas measuring device 100 thermally separates the detector 10 from the compensator 11. The invention can also be implemented without such a thermal barrier.

The gas measuring device 100 according to FIG. 1 is constructed as a Wheatstone measuring bridge. The voltage sensor 40 measures the bridge voltage $\Delta U\_B$ in the Wheatstone bridge. This bridge voltage $\Delta U\_B$ functions as the first detection variable of the embodiment according to FIG. 1. In the first embodiment, the first detection variable depends on the voltage U10 applied to the detector 10 and on the voltage U11 applied to the compensator 11 as follows: it is the larger the larger the detector voltage U10 is and the smaller the larger the compensator voltage U11 is. The voltage sensor 12.2 measures the electrical voltage U11 applied to the compensator 11. The electrical voltage U11 applied to the compensator 11 acts as the second detection variable of the embodiment according to FIG. 1. The current intensity (amperage) sensor 41 measures the intensity 13 of the current flowing through the line 3.

The electrical resistor R20 is connected in parallel with the detector 10, and the electrical resistor R21 is connected in parallel with the compensator 11. In FIG. 1 the following variables are indicated:
- the electrical resistance R10 of the detector 10,
- the electrical resistance R11 of the compensator 11,
- the voltage U42 of the voltage source 42,
- the electrical voltage U10 applied to the detector 10, and
- the electrical voltage U11 applied to the compensator 11.

Note: The term "electrical resistance" refers on the one hand to an electrical property of a component, here for example the electrical resistance R10 of the detector 10, and on the other hand to an electrical component, for example the electrical resistance (resistor) R20 in parallel with the detector 10.

In addition, two sensors 14, 15 of the gas measuring device 100 measure two different environmental conditions. The temperature sensor 14 measures the ambient air temperature in the environment of the gas measuring device 100, and the pressure sensor 15 measures the ambient air pressure in the environment. In the embodiment, the gas measurement device 100 does not include a humidity sensor that measures ambient humidity. The ambient humidity functions as or belongs to the first further environmental condition in the sense of the claims that is not directly measured, the ambient pressure as a directly measured second further environmental condition. It is also possible that the summed influence of the ambient humidity and the ambient CO2 concentration is used as the first further environmental condition.

The measured values from the sensors 40, 12.2, 41, 14, 15 are transmitted to the control unit 6 and processed by the control unit 6.

As already explained, the temperature of the detector heating segment 20 is influenced on the one hand by the thermal energy released during the oxidation of combustible target gas in the detector chamber 8. On the other hand, this temperature is influenced by environmental conditions. Because the compensator 11 does not oxidize combustible target gas, its temperature is substantially affected by environmental conditions. In addition, the compensator temperature may be affected by the fact that many combustible target gases have higher thermal conductivity than ambient air. The difference between the temperatures of the detector 10 and the compensator 11 depends essentially only on the target gas concentration being sought.

In the example shown in FIG. 1, the components form the Wheatstone bridge. The detector 10 and the compensator 11 are connected in series. The electrical resistance of the voltage sensor 40 is high compared to the electrical resistances of the components 10, 11, R20, R21. In one embodiment, the voltage sensor 40 directly measures the so-called bridge voltage $\Delta U\_B=(U10-U11)/2$. The corrected bridge voltage $\Delta U\_B_{korr}=\Delta U\_B-\Delta U\_B0$ correlates with the sought target gas concentration. Here, $\Delta U\_B0$ is the zero point, i.e. that bridge voltage $\Delta U\_B$ which occurs when no combustible target gas is present in the area to be monitored and thus inside the gas measuring device 100. The voltage sensor 12.2 measures the voltage U11 applied to the compensator 11.

It is well known that the temperature of an electrically conductive component correlates with its electrical resistance. In one embodiment, the current I3 is kept constant by an automatic closed-loop control. More specifically, a closed-loop control is carried out with the control gain of keeping the current intensity 13 constant. The control unit 6 carries out this control. Thanks to this control, the bridge voltage $\Delta U\_B$ correlates with the electrical resistance R of the detector 10 and is therefore an indicator of the temperature of the detector 10.

Figure 3:
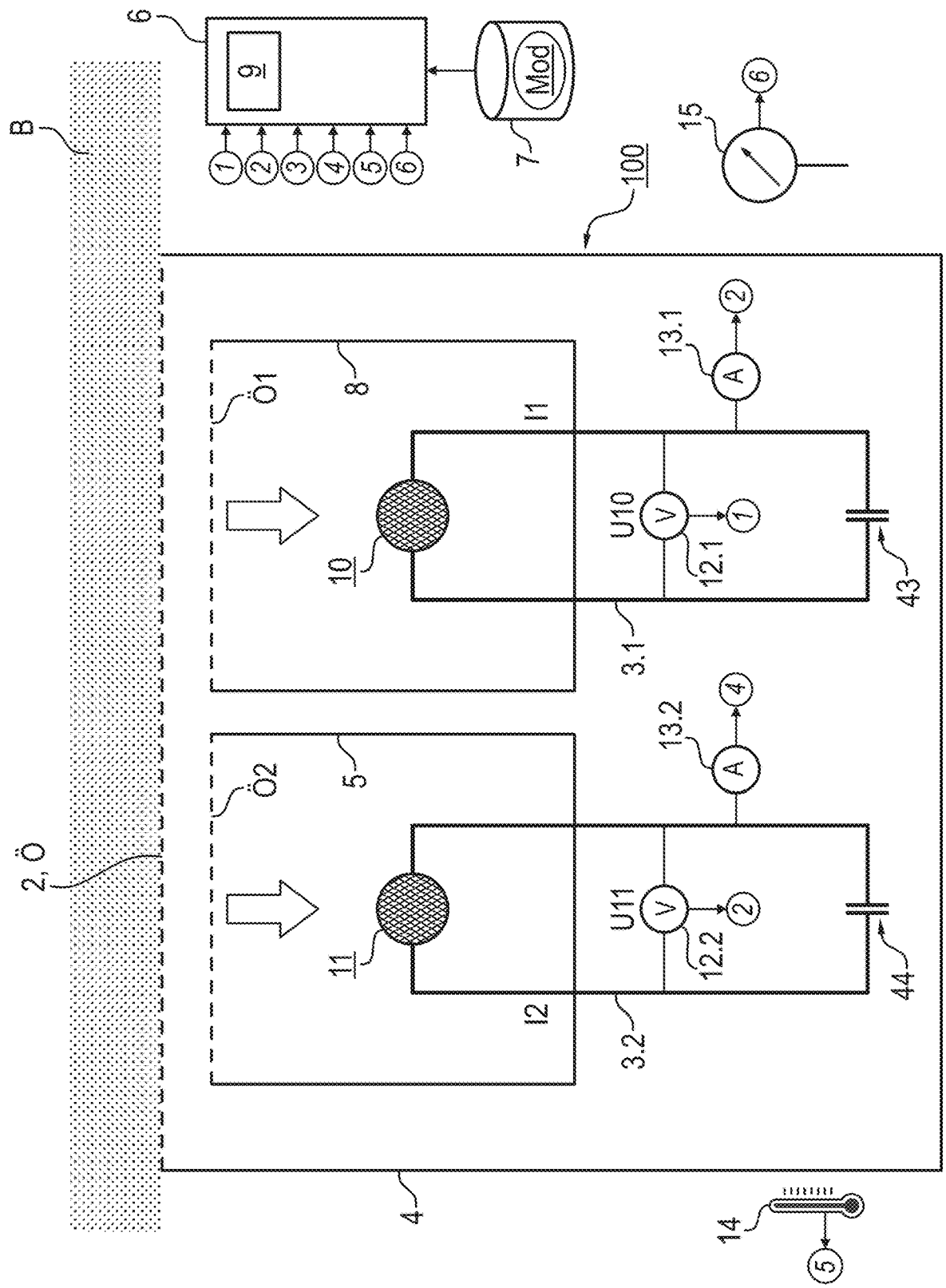
FIG. 3 is a schematic view showing a second embodiment of the gas measuring device.

FIG. 3 shows a second embodiment of the gas measuring device 100. The same reference signs have the same meaning as in FIG. 1. The detector chamber 8 is in fluid connection with the area B to be monitored via an opening Ö1, the compensator chamber 5 via an opening Ö2.

According to the second embodiment, the detector 10 and the compensator 11 are independently supplied with electrical power. A first electrical circuit connects the detector 10 to a first voltage source 43, and a second electrical circuit connects the compensator 11 to a second voltage source 44.

A voltage sensor 12.1 measures the electrical voltage U10 applied to the detector 10. A current sensor (amperage sensor) 13.1 measures the intensity (amperage) I.1 of the electric current flowing through the circuit for the detector 10. In one implementation of the second embodiment, the voltage U10 applied to the detector 10 operates as the first detection variable. A voltage sensor 12.2 measures the electrical voltage U11 applied to the compensator 11. In the second embodiment, the voltage U11 applied to the compensator 11 functions as the second detection variable. A current sensor (amperage sensor) 13.2 measures the intensity 1.2 of the electric current flowing through the circuit for the compensator 11.

In one alternative implementation, the voltage difference $\Delta U=U10-U11$ is calculated and used as the first detection variable, which is ideally equal to zero if no combustible target gas is present, but in practice differs from zero even in the absence of combustible target gas. Therefore, a corrected voltage difference $\Delta U_{korr}$=U10−U11−$\Delta$U0 is calculated. According to an implementation of the second embodiment, the corrected voltage difference $\Delta U_{korr}$=U10−U11−$\Delta$U0 correlates with the target gas concentration. The zero point $\Delta$U0 is the voltage difference U10−U11 that occurs when no combustible target gas is present. In this implementation the corrected voltage difference $\Delta U_{korr}$=U10−U11−$\Delta$U0 acts as the first detection variable. More general: In the alternative implementation the first detection variable is the larger the larger U10 is and is the smaller the larger U11 is.

The detection variable electrical voltage U is influenced by the target gas concentration sought and, in the embodiment, by the three environmental conditions of ambient temperature, ambient humidity and ambient pressure. In many cases, each of these four influences can be assumed to be linear. Then the following applies:

$$U10 = k_{10} * \text{con} + m_{Temp,10} * \text{Temp} + m_{P,10} * P + m_{Hum,10} * \text{Hum} + U10,0 \quad (1)$$

and $$U11 = k_{11} * \text{con} + m_{Temp,11} * \text{Temp} + m_{P,11} * P + m_{Hum,11} * \text{Hum} + U11,0 \quad (2)$$

and therefore $$U10 - U11 = (k_{10} - k_{11}) * \text{con} + (m_{Temp,10} - m_{Temp,11}) * \text{Temp} + (m_{P,10} - m_{P,11}) * P + (m_{Hum,10} - m_{Hum,11}) * \text{Hum} + (U10,0 - U11,0) \quad (3)$$

and $$\Delta U\_B_{korr} = \Delta U\_B - \Delta U\_B0 \text{ with } \Delta U\_B = (U10 - U11)/2 \quad (4)$$

and $$\Delta U\_B = (k_{10} - k_{11})/2 * \text{con} + (m_{Temp,10} - m_{Temp,11})/2 * \text{Temp} + (m_{P,10} - m_{P,11})/2 * P + (m_{Hum,10}\ m_{Hum,11})/2 * \text{Hum} + \Delta U\_B0. \quad (5)$$

The symbols have the following meanings:

| | |
|---|---|
| con | Sought target gas concentration |
| Temp | Ambient temperature |
| P | Ambient pressure |
| Hum | Ambient humidity |
| $k_{10}$ | Proportionality factor for the dependence of the detector voltage 10 on the target gas concentration con |
| $k_{11}$ | Proportionality factor for the dependence of the compensator voltage 11 on the target gas concentration con |
| $m_{Temp,\ 10}$, $m_{Temp,\ 11}$ | Proportionality factors for ambient temperature Temp |
| $m_{P,\ 10}$, $m_{P,\ 11}$ | Proportionality factors for the ambient pressure P |
| $m_{Hum,\ 10}$, $m_{Hum,\ 11}$ | Proportionality factors for ambient humidity Hum |
| U10 | Electrical voltage applied to detector 10 |
| U11 | Electrical voltage applied to compensator 11 |
| U10, 0 | Zero point of the electrical voltage applied to the detector 10, i.e. the electrical voltage applied in a condition free of combustible target gas |
| U11, 0 | Zero point of the electrical voltage applied to the compensator 11, i.e. the electrical voltage applied in a condition free of combustible target gas |
| $\Delta$U_B | Bridge voltage, measured by voltage sensor 40, equal to (U10 − U11)/2 |
| $\Delta$U_B0 | Zero point of the bridge voltage $\Delta$U_B |

In one embodiment, the compensator 11 is not capable of oxidizing any combustible target gas at all, and the factor $k_{11}$ is zero. It is also possible that the factor $k_{11}$ is less than zero. This is because many combustible target gases to be detected have higher thermal conductivity than ambient air, so they cool the compensator 11, causing the electrical voltage U11 to be lower than in the absence of combustible target gas. In another embodiment, the compensator 11 is less capable of oxidizing combustible target gas than the detector 10, and $k_{11}$ is greater than zero but less than $k_{10}$ by a factor of 10, preferably by a factor of 20.

Figure 4:
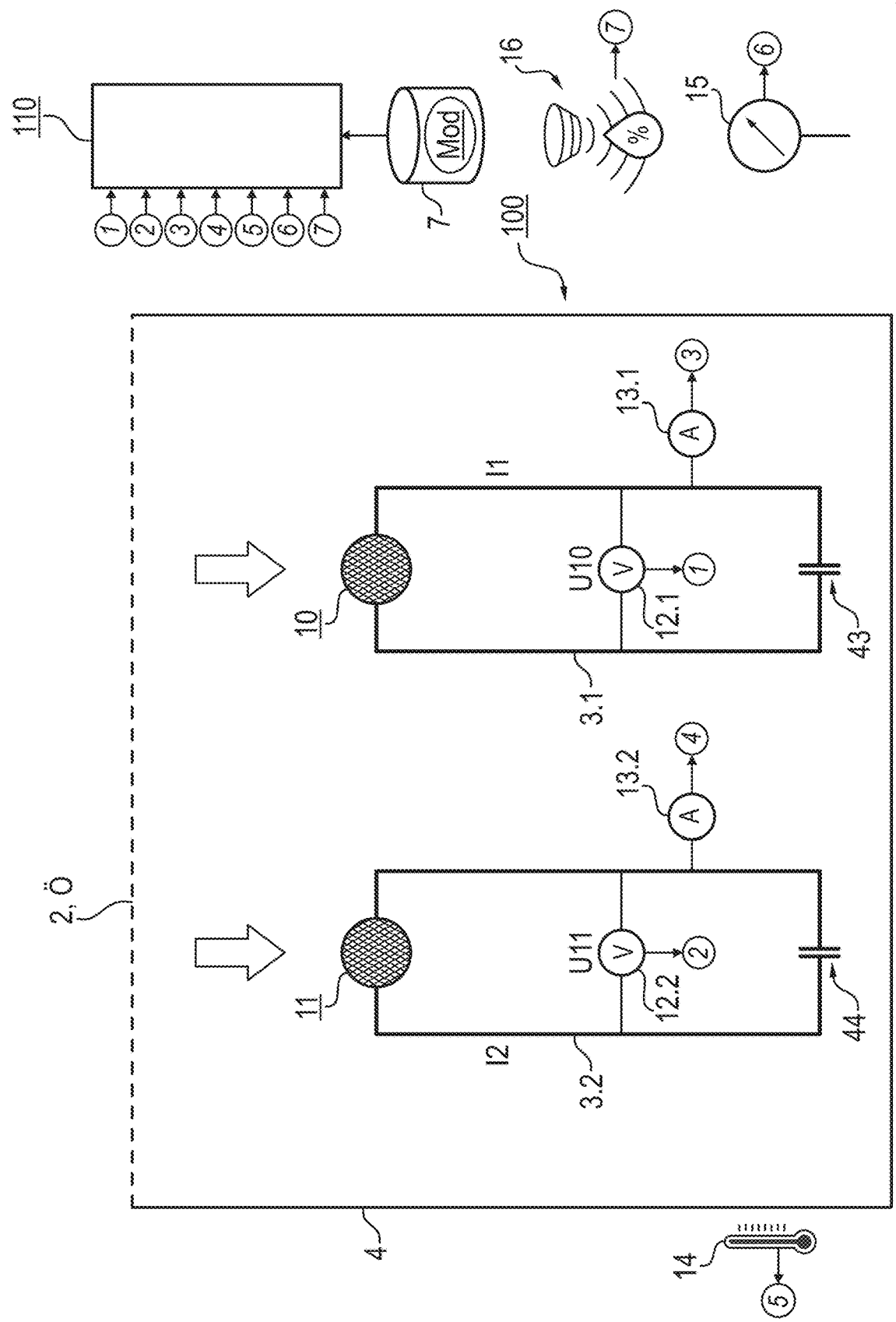
FIG. 4 is a schematic view showing the calibration device of the arrangement according to the invention.

Preferably, a calibration device 110 performs two adjustments in succession. FIG. 4 schematically shows this calibration device 110.

In both adjustments, different states are produced. In each state, the concentration con of combustible target gas, the ambient temperature Temp, the ambient pressure P, and the ambient humidity Hum are known. In one embodiment, the ambient temperature Temp and the ambient pressure P are measured by the temperature sensor 14 and the pressure sensor 15, respectively, of the gas measuring device 100, and the ambient humidity Hum is measured by a humidity sensor 16, which in the embodiment is not part of the gas measuring device 100 and is used only for the adjustment.

In this state with known environmental conditions, the bridge voltage $\Delta$U_B and the compensator voltage U11 (first embodiment according to FIG. 1) or the detector voltage U10 and the compensator voltage U11 (second embodiment according to FIG. 3) are measured. The detector voltage U10 is derived from the bridge voltage $\Delta$U_B and the compensator voltage U11 in the first embodiment or from $\Delta$U and U11 in one implementation of the second embodiment. The different states each provide a sample with several sample elements. Thus, the two adjustments provide two samples.

During the first adjustment, different states are produced one after the other in which no combustible target gas is present. The states during the first adjustment differ from each other with regard to the ambient temperature Temp, the ambient pressure P and/or the ambient humidity Hum. The first adjustment provides a first sample. Each sample element includes a value for the ambient temperature Temp, the ambient pressure P, and the ambient humidity Hum as well as the resulting value for the detector voltage U10 or for the compensator voltage U11. During the first adjustment, values for the following parameters are determined: the zero points U10,0 and U11,0 as well as the proportionality factors $m_{Temp,10}$, $m_{P,10}$ and $m_{Hum,10}$, and $m_{Temp,11}$, mph and $m_{Hum,11}$. The sought parameter values are preferably determined by a regression analysis.

An alternative implementation does not require an analytical model equation with model parameters. Rather, a neural network is trained using the sample just described.

During the second adjustment, states are produced successively in which a combustible target gas with different concentrations is present in the environment of the gas measuring device 100 and therefore also in the detector chamber 8 and in the compensator chamber 5. Also, the conditions during the second adjustment preferably have different environmental conditions. In the second adjustment, values for the two proportionality factors $k_{10}$ and $k_{11}$ are determined. The values for the six proportionality factors $m_{Temp,10}$, $m_{P,10}$ and $m_{Hum,10}$. and $m_{Temp,11}$, $m_{P,11}$ and $m_{Hum,11}$, which were specified during the first adjustment, are preferably used again during the second adjustment.

In many cases, the detector 10 and the compensator 11 are approximately equally sensitive to the ambient humidity Hum, so that $m_{Hum,10}=m_{Hum,11}$. Then (3) simplifies to $$U10-U11=(k_{10}-k_{11})*con+(m_{Temp,10}-m_{Temp,11})*Temp+(m_{P,10}-m_{P,11})*P+(U10,0-U11,0) \quad (6)$$

and (5) simplifies to $$\Delta U\_B=(k_{10}-k_{11})/2*con+(m_{Temp,10}-m_{Temp,11})/2*Temp+(m_{P,10}-m_{P,11})/2*P+\Delta U\_B0. \quad (7)$$

In many cases, the compensator 10 and the detector 11 are also equally sensitive to the ambient temperature Temp and the ambient pressure P, so that the further simplified equations, $$U10-U11=(k_{10}-k_{11})*con+(U10,0-U11,0) \quad (8)$$

and $$\Delta U\_B=(k_{10}-k_{11})/2*con+\Delta U\_B0 \quad (9)$$

are usable.

If the compensator 11 is not able to oxidize combustible target gas at all or only to a negligible extent, the factor $k_{11}$ is zero, so that the above calculation rules are further simplified.

The evaluation unit 9 has at least temporarily read access to a data memory 7. A model Mod is stored in this data memory 7 in a form that can be evaluated by a computer. In one implementation, the model Mod comprises the following analytical model equations:

in the first embodiment according to FIG. 1, the equations (7) or (9) resolved according to con and in the second embodiment according to FIG. 3, the equations (6) or (8) resolved according to con.

If there is no combustible target gas above a detection threshold in the area to be monitored, con=0. Equations (1), (2), (3) and (5) simplify to $$U10=m_{Temp,10}*Temp+m_{P,10}*P+m_{Hum,10}*Hum+U10,0 \quad (10)$$

and $$U11=m_{Temp,11}*Temp+m_{P,11}*P+m_{Hum,11}*Hum+U11,0 \quad (11)$$

and $$\Delta U\_B=(m_{Temp,10}-m_{Temp,11})/2*Temp+(m_{P,10}-m_{P,11})/2*P+(m_{Hum,10}-m_{Hum,11})/2*Hum+\Delta U\_B0. \quad (12)$$

It also follows from (10) and (11):

$$U10+U11=(m_{Temp,10}-m_{Temp,11})*Temp+(m_{P,10}+m_{P,11})*P+(m_{Hum,10}+m_{Hum,11})*Hum+(U10,0+U11,0). \quad (13)$$

In the embodiment, the model Mod stored in the data memory 7 additionally comprises the following analytical model equations:

in the first embodiment according to FIG. 1, the equation (12) being resolved according to Hum and in the second embodiment according to FIG. 2, at least one of the equations (10), (11) and (13) being resolved according to Hum.

It is possible to perform the first adjustment and/or the second adjustment again after a use of the gas measuring device 100, for example when the previous duration of use of the gas measuring device 100 has exceeded a predefined duration threshold and/or when the previous load of the gas measuring device 100 with combustible target gas has exceeded a target gas threshold. In one embodiment, the same steps are performed during the second adjustment as during the first adjustment. It is also possible that the zero values are determined more frequently than the model parameters.

In another embodiment, a simplified procedure is carried out during the second adjustment. Only the factors $k_{10}$ and $k_{11}$ as well as the zero point voltages U10.0, U11.0 and/or $\Delta U\_B0$ are determined again. It is possible that the zero point voltages U10,0, U11,0 and/or $\Delta U\_B0$ are determined again for the environmental conditions that exist during the second adjustment. In contrast, it is assumed that the factors $m_{Temp,10}$, $m_{Temp,11}$, $m_{P,10}$, $m_{P,11}$, $m_{Hum,10}$ and $m_{Hum,11}$ remain constant throughout the period of use of the gas measurement device 100 and therefore do not need to be redetermined. Rather, the values determined during the initial adjustment continue to be used.

In one implementation, during the second adjustment, the gas measuring device 100 is exposed, on the one hand, to an environment with breathing air that is free of combustible target gas and, on the other hand, to an environment with a gas mixture comprising breathing air and a combustible target gas, this gas mixture preferably originating from a cylinder and therefore having no appreciable moisture.

Described below is how the gas measurement device 100 is used both to detect the presence of combustible target gas and/or to measure the target gas concentration con, and to approximately measure ambient humidity Hum.

If combustible target gas is present in the area B to be monitored, the bridge voltage $\Delta U\_B$ (first embodiment) or the detector voltage U10 or the voltage difference $\Delta U=U10-U11$ (second embodiment) are essentially influenced by the sought target gas concentration con. The compensator 11 largely compensates for the influence of the ambient temperature Temp, the ambient pressure P, and the ambient humidity Hum. In one implementation, the sought target gas concentration con is therefore determined as a function of the measured bridge voltage $\Delta U\_B$ or the voltage difference $\Delta U$ and the two proportionality factors $k_{10}$ and $k_{11}$, preferably according to one of the model equations (6) or (7) resolved according to con, which are stored in the data memory 7. It is also possible to additionally take into account the influence of the ambient temperature Temp and the ambient pressure P and therefore preferably to use one of the stored model equations (8) or (9) resolved according to con.

If the corrected bridge voltage $\Delta U\_B_{korr}$ is within a specified range, preferably within a tolerance band around zero, then no combustible target gas above the detection threshold is present in the area B to be monitored. If no combustible target gas is present, then both the detector voltage U10 and the compensator voltage U11 are affected by the ambient temperature Temp, the ambient pressure P, and the ambient humidity Hum. The temperature sensor 14 measures the ambient temperature Temp, and the pressure sensor 15 measures the ambient pressure P. By the first adjustment, the proportionality factors $m_{Temp,11}$, $m_{P,11}$ and $m_{Hum,11}$ are fixed.

In one embodiment, the voltage U11 applied to the compensator 11 is used to determine the ambient humidity Hum in the absence of combustible target gas, preferably according to the model equation resolved and stored according to Hum $$U11=m_{Temp,11}*Temp+m_{P,11}*P+m_{Hum,11}*Hum+U11,0. \quad (11)$$

It is also possible to use the voltage U10 applied to the detector 10 to determine the ambient humidity Hum. Preferably, the model equation resolved and stored according to Hum is used for this.

$$U10 = m_{Temp,10} * \text{Temp} + m_{P,10} * P + m_{Hum,10} * \text{Hum} + U10,0 \quad (10)$$

is used. In the first embodiment, the detector voltage U10 is derived from the compensator voltage U11 and the bridge voltage ΔU_B; in the second embodiment, it is measured directly.

It is also possible to derive the voltage sum U10+U11 and use the model equation resolved and stored according to Hum $$U10+U11 = (U10,0+U11,0) + (m_{Temp,10} + m_{Temp,11}) * \text{Temp} + (m_{P,10}+m_{P,11}) * P + (m_{Hum,10} + m_{Hum,11}) * \text{Hum}. \quad (13)$$

In many cases, it is reasonable to assume that the detector 10 and the compensator 11 are in fact equally sensitive to ambient temperature Temp, ambient humidity Hum, and atmospheric pressure P. With this assumption, (13) simplifies to $$U10+U11 = (U10,0+U11,0) + 2*m_{Temp,10}*\text{Temp} + 2*m_{P,10}*P + 2*m_{Hum,10}*\text{Hum}. \quad (13)$$

In one embodiment, a measured value vector is generated at each sampling time point at which the sensors of the gas measurement device 100 each provide a measured value. The vector is transmitted to a spatially remote receiver. This measured value vector comprises the measured values of the following quantities:
 the compensator voltage U11 and the bridge voltage ΔU_B (first embodiment) or the detector voltage U10 or the difference U10−U11 (second embodiment) and the ambient temperature Temp and the ambient pressure P.

If combustible target gas is present at the sampling time, the measured values vector also includes the measured target gas concentration con. If no combustible target gas is present at the time of sampling, the measured values vector also includes the derived value of the ambient humidity Hum.

The transmitted measured value vectors can be used, for example, for the following application: A malfunction of the gas measurement device 100 has been detected. Searched for are such target gas concentrations and environmental conditions at which this malfunction occurred.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| 1 | Stable housing of the gas measuring device 100, accommodates the detector 10 and the compensator 11, has the opening Ö, surrounded by the outer housing 4 |
| 2 | Flame barrier in the opening Ö, for example configured as a metal grid and/or sintered plate |
| 3 | Electrical line or line arrangement which connects the detector 10 and the compensator 11 to the voltage source 42 and thereby supplies them with electrical energy |
| 4 | Outer housing of the gas measuring device 100, accommodates the inner housing 1, the optional electrical resistors R20 and R21, the sensors for current, voltage and temperature, the control unit 6 with the evaluation unit 9 and the voltage source 42, has the opening Ö |
| 5 | Compensator chamber in housing 1, surrounds compensator 11, has opening Ö2 |
| 6 | Signal-processing control unit, receives signals from the sensors 12.1, 12.2, 13.1, 13.2, 40 and 41, controls the electrical resistors R10 and R11 as required, comprises the evaluation unit 9 |
| 7 | Data memory in which the model Mod is stored |
| 8 | Detector chamber in housing 1, surrounds detector 10, has opening Ö1 |
| 9 | Signal-processing evaluation unit, receives measured values from the sensors and evaluates them |
| 10 | Detector, arranged in the detector chamber 8, comprises the detector heating segment 20, the ceramic cladding 21, a coating 23 or embedding of a catalytic material and the mounting plate 22, is configured as a pellistor |
| 11 | Compensator, comprises compensator heating segment 30, arranged in compensator chamber 5 |
| 12.1 | Voltage sensor, measures the electrical voltage U10 applied to the detector 10. |
| 12.2 | Voltage sensor, measures the electrical voltage U11 applied to the compensator 11. |
| 13.1 | Current intensity sensor (amperage sensor), measures the intensity I.1 of the electric current flowing through the detector 10 |
| 13.2 | Current intensity sensor (amperage sensor), measures the intensity I.2 of the electric current flowing through the compensator 11 |
| 14 | Temperature sensor, measures the temperature Temp in the environment of the gas measuring device 100 |
| 15 | Pressure sensor, measures the air pressure P in the environment of the gas measuring device 100 |
| 16 | Humidity sensor, measures an indicator of ambient humidity Hum |
| 20 | Spiral electrically conductive wire, acts as the detector heating segment |
| 21 | Ceramic coating around the wire 20, provided with a catalytic coating 23. |
| 22 | Mounting plate holding the wire 20 and the ceramic coating 21 |
| 23 | Coating of the ceramic cladding 21 from a catalytic material |
| 30 | Compensator heating segment |
| 36 | Mechanical holders for the wire 20 |
| 40 | Voltage sensor, measures the electrical bridge voltage, namely half the voltage difference ΔU = U10 − U11 |
| 41 | Current intensity sensor (amperage sensor), measures the current intensity I3 in the line 3 |
| 42 | Power supply unit |
| 100 | Gas measuring device according to the invention |
| 110 | Calibration device, includes humidity sensor 16, generates model Mod, which is stored in data memory 7 |
| B | Area to be monitored |
| con | Sought-after target gas concentration |
| I3 | Coinciding strength of the electric current flowing through the detector 10 and the compensator 11 (Wheatstone measuring bridge) |
| I1 | Strength of the electric current flowing through the detector 10 |
| I2 | Strength of the electric current flowing through the compensator 11 |
| $k_{10}$ | Proportionality factor for the dependence of the detector voltage 10 on the target gas concentration |
| $k_{11}$ | Proportionality factor for the dependence of the compensator voltage 11 on the target gas concentration |
| $m_{Hum,10}$, $m_{Hum,11}$ | Proportionality factors for ambient humidity Hum |
| $m_{P,10}$, $m_{P,11}$ | Proportionality factors for the ambient pressure P |
| $m_{Temp,10}$, $m_{Temp,11}$ | Proportionality factors for ambient temperature Temp |
| Mod | Model, which is stored in data memory 7 and describes at least one relationship between electrical voltage, target gas concentration, and environmental conditions, comprises, in one embodiment, a plurality of model equations |
| Ö | Opening in the housing 1 through which a gas mixture can flow from the area B into the interior of the housing 1 and into which the flame barrier 2 is inserted |
| Ö1 | Opening in the detector chamber 8 |
| Ö2 | Opening in the compensator chamber 5 |
| R10 | Electrical resistance of the detector 10, correlated with the temperature of the detector 10 |

-continued

| | |
|---|---|
| R11 | Electrical resistance of the compensator 11, correlated with the temperature of the compensator 11 |
| R20 | Component configured as an electrical resistor connected in parallel with the detector 10 |
| R21 | Component configured as an electrical resistor connected in parallel with the compensator 11 |
| U10 | Electrical voltage applied to the detector 10 |
| U10, 0 | Zero point of the electrical voltage applied to the detector 10 |
| U11 | Electrical voltage applied to the compensator 11 |
| U11, 0 | Zero point of the electrical voltage applied to the compensator 11 |
| ΔU | Voltage difference, equal to U10 − U11 |
| ΔU0 | Zero point for the voltage difference |
| ΔU_B | Bridge voltage, equal to (U10 − U11)/2 |
| ΔU_B0 | Zero point for bridge voltage ΔU_B, equal to (U10, 0 − U11, 0)/2 |
| ΔU_B$_{korr}$ | Corrected bridge voltage, equal to ΔU_B − ΔU0_B |
| U42 | Electrical voltage of the voltage source 42 |

What is claimed is:

1. A gas measuring device for measuring the concentration of a combustible target gas, the gas measuring device comprising:
a detector comprising a detector heating segment, the detector being configured to oxidize combustible target gas located inside the gas measuring device by heating the detector heating segment;
a compensator comprising a compensator heating segment, the compensator being configured to oxidize combustible target gas located inside the gas measuring device to a lesser extent than the detector or the compensator being configured to not oxidize combustible target gas and/or the gas measuring device is configured such that a smaller quantity per time unit of combustible target gas from an environment of the gas measuring device reaches the compensator than the detector;
a sensor arrangement configured to measure a first detection variable and a second detection variable;
a temperature sensor configured to measure an indicator of ambient temperature in the environment of the gas measurement device;
a signal-processing evaluation unit; and
a data memory, the evaluation unit having at least temporary read access to the data memory, wherein a computer evaluable model is stored in the data memory, the stored model comprises a first functional relationship and a second functional relationship, the first functional relationship describes a dependence between a target gas concentration on the one hand and at least the first detection variable on the other hand, and the second functional relationship describes a dependence between a first further environmental condition on the one hand and the ambient temperature and at least one of the first detection variable and the second detection variable on the other hand, wherein the first further environmental condition is different from the ambient temperature and wherein the second functional relationship is valid at least if the concentration of the combustible target gas is below a predetermined concentration threshold,
wherein the gas measuring device is configured to apply an electrical voltage to the detector such that an electrical current flows through the detector heating segment and the detector heating segment is heated, and to apply an electrical voltage to the compensator so that an electrical current flows through the compensator heating segment and the compensator heating segment is heated,
wherein in a first alternative, the first detection variable depends on a detector temperature, which is a temperature of the detector heating segment, and the second detection variable depends on a compensator temperature, which is a temperature of the compensator heating segment,
wherein in a second alternative, the first detection variable depends on both the detector temperature and the compensator temperature, and the second detection variable depends either on the detector temperature but not on the compensator temperature or depends on the compensator temperature but not on the detector temperature,
wherein the evaluation unit is configured to determine the target gas concentration depending at least on the measured first detection variable and using the first functional relationship,
wherein the evaluation unit is further configured to determine whether the second functional relationship is valid or not at the determined target gas concentration, and
wherein the evaluation unit is further configured to determine, if the second functional relationship is valid, the first further environmental condition depending on the measured ambient temperature and at least one of the measured first detection variable or the measured second detection variable and using the second functional relationship.

2. A gas measuring device according to claim 1, wherein:
the first further environmental condition additionally occurs in the first functional relationship, so that the first functional relationship describes the dependence between the target gas concentration on the one hand and at least the first detection variable and the first further environmental condition on the other hand; and
the evaluation unit is configured to use a first further environmental condition value for determining the target gas concentration if there is a value determined by the evaluation unit for the first further environmental condition and is configured to otherwise use a given default value for the first further environmental condition.

3. A gas measuring device according to claim 1, wherein:
a value range is specified for the first further environmental condition; and
the gas measuring device is configured to generate a message if the evaluation unit has determined a value for the first further environmental condition that lies outside the specified value range.

4. A gas measuring device according to claim 1, wherein:
the gas measurement device is configured to receive a signal from an environmental condition sensor;
the environmental condition sensor is configured to measure an indicator of the first further environmental condition;
the signal received from the environmental condition sensor comprises information about a value of the first further environmental condition, the value measured by the environmental condition sensor; and
the evaluation unit is configured to use either a first vale for the first further environmental condition or a second value for the first further environmental condition, and/or to compare the first value for the first further environmental condition with the second value for the first further environmental condition; and the first value for the first further environmental condition is determined by the evaluation unit using the second functional relationship and the second value for the first further environmental condition is determined by the evaluation unit from the received signal.

5. An arrangement comprising:

a gas measuring device according to claim 1; and a calibration device that is configured to generate a sample having a plurality of sample elements, the calibration device comprising an environmental condition sensor that is configured to measure an indicator of the first further environmental condition, wherein each sample element includes a value measured by the sensor arrangement for the first detection variable, a value measured by the sensor arrangement for the second detection variable, a value by the temperature sensor for the ambient temperature measured and a value measured by the environmental condition sensor for the first further environmental condition; and wherein the calibration device is configured to use the sample to generate the first functional relationship and the second functional relationship and to cause the two generated functional relationships to be stored in the data memory.

6. A gas measurement process for measuring the concentration of a combustible target gas, the process comprising the steps of:

providing a gas measuring device, wherein the gas measuring device comprises: a detector comprising a detector heating segment; a compensator comprising a compensator heating segment, a sensor arrangement, and a temperature sensor;

with the temperature sensor, measuring an indicator of ambient temperature in an environment of the gas measuring device;

applying an electric voltage to the detector such that an electric current flows through the detector heating segment and the detector heating segment is heated;

oxidizing a combustible target gas located inside the gas measuring device by heating the detector heating segment, the combustible target gas having reached the inside the gas measuring device from the environment of the gas measuring device;

applying an electric voltage to the compensator such that an electric current flows through the compensator heating segment and the compensator heating segment is heated;

oxidizing the combustible target gas with the compensator to a lesser extent than the detector oxidizes the combustible target gas or not oxidizing the combustible target gas with the compensator and/or allowing a smaller amount per time unit of combustible target gas from the environment of the gas measuring device to reach the compensator than the detector;

measuring a first detection variable and a second detection variable, wherein, in a first alternative, the first detection variable depends on a detector temperature, which is a temperature of the detector heating segment, and the second detection variable depends on a compensator temperature, which is a temperature of the compensator heating segment, and wherein, in a second alternative, the first detection variable depends on both the detector temperature and the compensator temperature, and the second detection variable depends on either the detector temperature but not on the compensator temperature or the compensator temperature but not on the detector temperature, providing a computer evaluable model that comprises a first functional relationship and a second functional relationship, wherein the first functional relationship describes a dependence between the target gas concentration on the one hand and at least the first detection variable on the other hand, wherein the second functional relationship describes a dependence between a first further environmental condition on the one hand and the ambient temperature and at least one of the first detection variable or the second detection variable on the other hand, wherein the first further environmental condition is different from the ambient temperature, wherein the second functional relationship is valid at least if the concentration of the combustible target gas is below a predetermined concentration threshold;

determining the target gas concentration depending at least on the measured first detection variable and using the first functional relationship;

determining whether or not the second functional relationship is valid at the determined target gas concentration; and if the second functional relationship is valid, determining the first further environmental condition depending on the measured ambient temperature and on at least one of the measured first detection variable or the measured second detection variable and using the second functional relationship.

* * * * *